Patented July 29, 1941

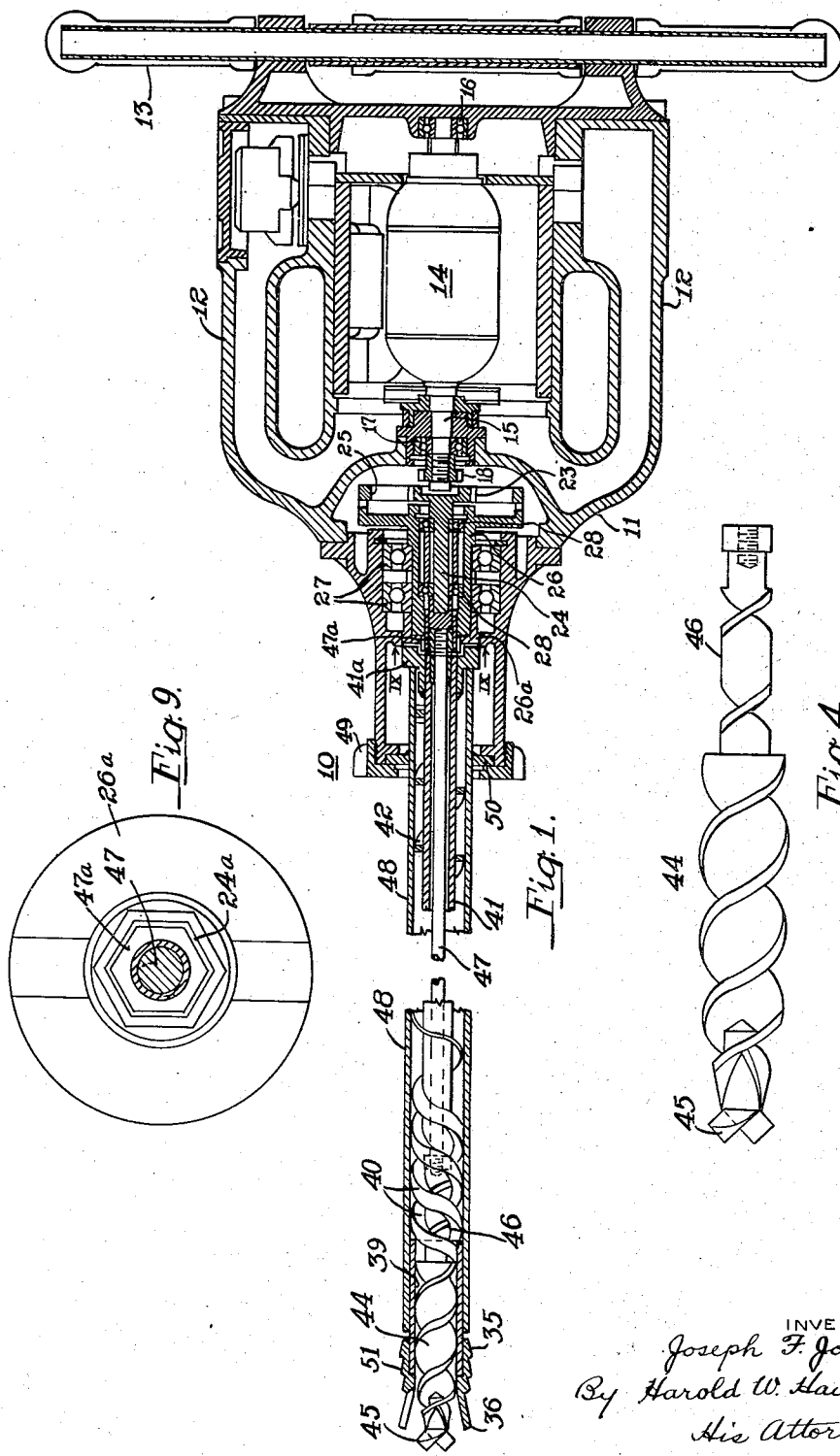

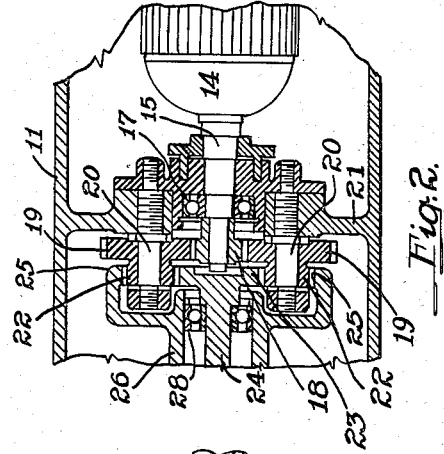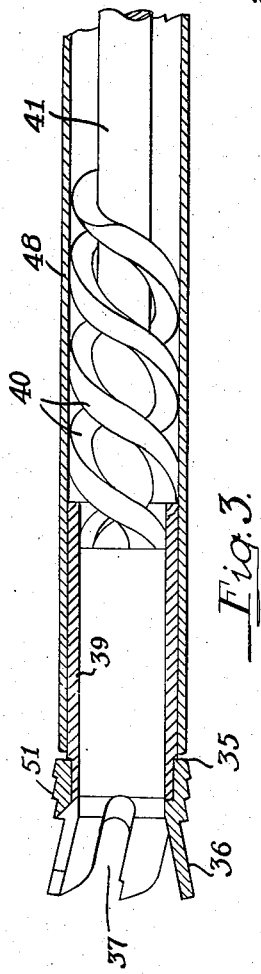

2,250,671

UNITED STATES PATENT OFFICE 2,250,671

DRILLING APPARATUS

Joseph F. Joy, Franklin, Pa., assignor to Joy Manufacturing Company, a corporation of Pennsylvania Application April 30, 1940, Serial No. 332,533

19 Claims. (Cl. 255—19)

This invention relates to material penetrating apparatus for boring holes in materials such as are generally drilled with rotary tools, and is particularly adapted for use in coal mining to bore holes in the solid coal face or adjacent strata preparatory to the insertion of explosives or other devices to break out or loosen the coal, and is a continuation in part of my co-pending application Serial No. 251,929, filed January 20, 1939.

Drills embodying the invention disclosed in the aforesaid application had a rotating outer tube carrying an annular cutter head, and an inner spiral rotating in an opposite direction to that of the outer tube, and having a pilot drill on the forward end thereof. While such drills had a relatively high penetrating speed when drilling holes to a depth of 5' or 6' in such materials as coal, sandstone, concrete, brick, etc., and were highly satisfactory in drilling holes to such depths, I found that they were impractical when drilling holes to greater depths of from 7' to 9', since the rotating tube and inter-rotating spiral were subject to chatter common to rotating tubes and spirals of relatively long length.

The principal object of this invention is to provide a rotary drilling apparatus capable of overcoming the above disadvantages which will penetrate material such as coal, sandstone, concrete, brick, etc. to a depth of 7' to 9' or more, at a high penetrating speed, whereby the drilling of the bore will be completed in a relatively short period at an exceedingly low cost, whereby the cost per ton of the material produced will be materially reduced.

Another object is to provide a drilling apparatus adapted especially for the drilling of solid coal which cuts a cylindrical core in the solid face, and immediately breaks up and conveys the cuttings away from the cutter head to clear bore hole.

A further object is to provide a rotary drilling apparatus having an annular cutter head provided with means for pushing the cuttings forwardly into the path of a conveyor adapted to remove the cuttings from the bore hole.

A still further object is to provide a drill having an annular rotatable cutter head, for cutting a core, mounted on a spiral conveyor member, and in which an auger extends through a portion of the spiral member and is adapted to rotate in an opposite direction from that of the annular cutter to break up the core and convey the same into the path of and to transfer the cuttings to the spiral member carrying the cutter head.

A still further object of this invention is to provide a rotary drilling apparatus which will penetrate solid material to a relatively great depth, at a high penetrating speed, without choking, and which is capable of being manually operated with comparative ease, with a high degree of safety for the operator, and is economical to maintain and operate since the wearing parts are readily removable and may be quickly and easily changed.

These and other objects which will hereinafter be made apparent to those skilled in this particular art, are accomplished by means of this invention, one embodiment of which is described in the following specification and illustrated in the accompanying drawings, wherein:

Fig. 1 is a horizontal section of a rotary drilling apparatus embodying my invention.

Fig. 2 is an enlarged vertical section illustrating the drive for the rotary tube carrying the cutter head and for the shaft carrying the auger;

Fig. 3 is an enlarged sectional view of the forward end of the drill with the inner core breaking member removed for convenience of illustration;

Fig. 4 is a view in elevation of the core breaking member;

Fig. 5 is a view in side elevation of the annular cutter head of my improved drill;

Fig. 6 is a front view of the annular cutter head;

Fig. 7 is a section taken on line VII—VII of Fig. 6;

Fig. 8 is an enlarged view in elevation of a tooth on the cutter head showing the mounting of the cutting bit; and Fig. 9 is a section taken on line IX—IX of Fig. 1.

Referring to the drawings in detail 10 represents a rotary drilling apparatus embodying my invention, comprising a support or housing 11, having opposed side handles 12 which are adapted to be grasped by the operator when the drill is being operated, and a push bar or handle 13 at the rear thereof by means of which the operator holds the drill against the work as the boring members penetrate the material being drilled.

The core cutting and core breaking elements of my proved drill, which will be hereinafter described in detail, are rotated in opposite directions by a suitable electric motor 14 mounted in the support 11, and having a motor shaft 15 which is journaled at its rear end in a bearing 16, carried by the support 11, and at its forward end in a bearing 17. Mounted on the forward end of the motor shaft 15 is a pinion 18 engaged on opposite sides by two gears 19, each of which is mounted on a stub shaft 20, carried by a separating web or partition 21, integral with the support 11. Each of the gears 19 have a pinion 22 secured to the face thereof, and the inner edge of each pinion meshes with a gear 23 on the end of a shaft 24, and the outer edges thereof mesh with an annular gear 25 carried by a tubular shaft 26, which surrounds and is concentric with the shaft 24, and is journaled in bearing 27 mounted in the forward necked end of the support or housing 11.

From this construction it is apparent that the shaft 24, which is journaled in bearing 28 within the tubular shaft 26, rotates in an opposite direction from the tubular shaft 26, and at a higher rate of speed, and in order to balance the work performed by the two drilling members I prefer to maintain such relation between the gear 25 and the gears 23, that the shaft 24 will be driven by the driving pinions 22 at approximately twice the speed of the tubular shaft 26.

The drilling or cutting elements of my improved drilling apparatus, which are connected to and rotate with the shafts 24—26, comprise an annular cutter head 35 adapted to rotate in a counterclockwise direction which resembles in appearance an end mill commonly used for cutting steel, and has a series of cutting teeth 36 separated from each other by slots 37. The outer ends of the teeth are slightly rounded and slope from the cutting edge, which is faced with a hard cutting bit 38 made of tungsten carbide or other suitable cutting material, toward the rear or trailing edge thereof.

While I have illustrated a cutter head with four teeth, in which two opposed teeth are sloped inwardly out of the cylindrical plane of the body of the head and the other two teeth extending outwardly from the body, it is to be understood that my invention is not limited to such construction, but that the head may, if desired, depending of course on the type and character of the material being drilled, with a greater or lesser number of teeth, all or any number of which may be positioned in the same plane so long as a hole is bored of sufficient diameter to permit the cutter head to enter the bore hole.

The cutter head 35, which is adapted to cut a core in the material being penetrated, is threaded on one end of a sleeve 39, having its opposite end extending over the forward ends of twin spiral members 40, to which the sleeve is attached. The spiral members 40, which are relatively wide in cross section and of substantially the same shape as a coil spring, are secured to and project beyond the forward end of a conveyor tube 41, which has its rear end removably connected to the tubular shaft 26 through a jaw clutch, one portion of which 41a is carried by the tube 41 and the other portion 26a is carried by the shaft 26 so that it is driven thereby. Surrounding the tube 41 is a spiral member 42 having its forward end secured to the rear end of one of the heavy twin spiral members 40, and its rear end slidably mounted in a guide (not shown) on the outer periphery of the conveyor tube 41. It is apparent from the foregoing description that the spiral member 42 is capable of movement longitudinally of the tube.

In order to break up the core formed by the annular cutter head 35, an auger 44 having a removable cutter 45 on its forward end is positioned within the sleeve for rotation in a clockwise direction. The forward end of the auger 44 is of substantially wedge shape and expands and breaks up the material of the core, as it follows into the bore hole, into sizes which permit the cuttings to be readily carried back by the auger to the screw conveyor 41—42.

The auger 44 is of substantially the same diameter as the sleeve 39 through which it extends, and to effect a transfer of the cuttings from the auger, which has a right-hand spiral, to the screw conveyor 41—42, which has a left-hand spiral, the rear end section 46 or the auger 44 is of reduced diameter and extends through and is surrounded by the twin spiral members 40, which are left-hand spirals, and form a continuation of the spiral 42. As the cuttings are carried rearwardly by the auger 44, they pass into section 46 where they are picked up by the spiral members 40 which convey the cuttings to the spiral member 42.

The auger is threaded onto the forward end of a rod 47 having a hexagonal shaped nut 47a on its rear end, which is received in a hexagonal shaped socket 24a on the forward end of the shaft 24 so that it rotates therewith.

From this construction it is apparent that in my improved drilling apparatus the auger section 46 operates within the spiral 40 and rotates in the opposite direction from the direction of rotation of the spiral 40. This arrangement not only yields rapid penetration, but eliminates entirely any choking of the cuttings between the oppositely rotating members, since the two oppositely rotating spiral members tend to break and chop up the cuttings which might become lodged in either of the spiral members.

To protect the operator of the drill from injury resulting from contact with the rotating parts of the drill, and to hold the tubular member 41 and the shaft 47 in the housing 11 and in engagement with the shafts 26 and 24 respectively, a sleeve 48 is provided which surrounds the spiral 42 and extends, at its rear end, into the housing and abuts against the clutch member 42a where it is held by a nut 49 threaded on the housing or support 11, and engaging a collar 50 secured to the sleeve 48. The forward end of the sleeve 48 surrounds the sleeve 39 and terminates just short of the annular cutter head 35 carried by the sleeve 39.

In order to prevent the cuttings from wedging between the outside of said stationary sleeve 48 and the wall of the bore hole, the annular cutter head 35 is provided on its outer surface, with a right-hand spiral projection 51 which, as the cutter rotates in a counter-clockwise direction, engages the cuttings passing back along the outside of the cutter head and moves the same forwardly in the bore into position to be picked up by the auger 44 for conveying the same rearwardly through the sleeve 39.

The trailing edges of the cutting teeth 36, and likewise the bottoms of the slots 37 between the teeth, are beveled to facilitate movement of the cuttings moved forward by the spiral projection 51 into the path of the auger 44.

Fig. 7 illustrates the preferred mounting for cementing or brazing of the cutter bits 38 on the teeth 36 of the cutter head 35. As shown in Fig. 8, the leading edge of each tooth 36 is cut away in such manner as to provide a relatively short shoulder 36a on the leading edge of the tooth which is separated from the surface 36b, against which the cutter bit 38 abuts, by a transverse slot 36c. The cutter bits 38, which have their lower ends positioned in the slots 36c of the teeth 36, are secured to the teeth along the top of the shoulders 36a, as well as along the surfaces 36b, and they are so firmly held in place on the teeth that loss of drilling time, resulting from lost cutter bits, is substantially reduced.

In the operation of my improved drill, for holes under 2" in diameter in coal, I have found that by rotating the spiral screw conveyor 41—42, which carries the cutter head 35 in counter-clockwise direction at a speed of approximately 600 R. P. M., and the shaft 48 carrying the auger 44 in a clockwise direction at a speed of approximately 1200 R. P. M., coal and other material can be penetrated at a relatively high rate of speed, and bore holes up to 9' in depth can be bored in a relatively short time. It is, of course, obvious that larger holes or harder material will require relatively slower speeds.

Further, by rotating the cutting elements of the drill in opposite directions, "kickbacks" are eliminated by the torque balancing resulting from such opposed directions of rotation, and sudden choking of the drill in the bore hole frequently encountered with drills having an uncovered power drive auger, is eliminated by the stationary sleeve, which also permits the drill to be operated in perfect safety, so far as bodily harm resulting from clothing becoming entangled in a rotating part is concerned, as it encloses all such rotating parts except the cutter head on the forward end of the drill, which is removed a considerable distance from the operator.

It is obvious from the foregoing description that I have provided a rotary drilling apparatus which affords the maximum of protection for the operator of the apparatus and safety of operation, since all of the rotating or moving parts of the drill, with the exception of the small cutters at the forward end of the drill, which are located a substantial distance from the support or housing held by the operator, are completely enclosed.

Further, by providing an annular cutter head having a reversely threaded outer surface, the cuttings are not only moved forwardly where they pass through the slots between the teeth and into position to be engaged by the auger, but also a bore of sufficient diameter is secured to insure clearance of the protecting sleeve and other parts of the boring bar of the drill, and permits the apparatus to be readily and easily withdrawn on completion of the bore hole.

While I have described one embodiment of my invention, and stated that it is particularly adapted to drilling coal, it is to be understood that my improved drilling apparatus can be used and is adapted to be used to drill any material now generally drilled by rotary drilling tools, such as sandstone, brick, concrete and the like, and that certain changes, modifications, substitutions, additions and subtractions may be made in the apparatus shown without departing from the spirit of my invention or the scope of the appended claims.

I claim as my invention:

1. In a rotary drilling apparatus the combination comprising a support, a rotatable tubular shaft having one end journaled in said support, a spiral conveyor on said shaft and extending from said support to the forward end thereof, a spiral member projecting beyond the forward end of said tubular shaft, a collar secured to said spiral member, and an annular cutter head carried by said collar.

2. Rotary drilling apparatus comprising a support, a rotatable tubular shaft carried by said support, a spirally arranged member on said shaft extending from said support to the forward end thereof, a second spiral member secured to the forward end of said shaft and projecting therebeyond, a collar secured to the forward end of said second spiral member, an annular cutter head carried by said collar, a rotatable shaft extending through said tubular shaft, and an auger secured to said last mentioned shaft and positioned within said annular cutter and said second spiral member.

3. Rotary drilling apparatus comprising a support, a rotatable shaft carried by said support, an auger secured to the forward end of said shaft, a rotatable tubular member surrounding said shaft, a spiral conveyor secured to said tubular shaft and surrounding a portion of said auger, and an annular cutter head carried by said spiral conveyor.

4. Rotary drilling apparatus of the character set forth in claim 3, in which the shaft and tubular member are rotatable in opposite directions, and the spiral of the auger and of the conveyor are opposite relative to each other.

5. Rotary drilling apparatus of the character set forth in claim 3, in which the tubular member and the shaft are rotatable in opposite directions.

6. Rotary drilling apparatus of the character set forth in claim 3, in which the portion of the auger surrounded by the forward end of the spiral conveyor is of reduced diameter to facilitate the transfer of the cuttings from the auger to the spiral conveyor.

7. Rotary drilling apparatus of the character set forth in claim 3, in which the cutter head is provided with means for pushing the cuttings forward into the path of the auger.

8. Rotary drilling apparatus of the character set forth in claim 3, in which the spiral conveyor is surrounded by a tube secured to the support and forming a wall for the spiral conveyor.

9. Rotary drilling apparatus of the character set forth in claim 1, in which the spiral member is substantially thicker in cross-section than the spiral conveyor and is connected thereto by a tapered section.

10. Rotary drilling apparatus comprising an annular cutter adapted to cut a core, a spiral conveyor on which said cutter is mounted, means within said annular cutter and projecting beyond said conveyor adapted to break up the core and convey the cuttings rearwardly into the path of said spiral conveyor, means for simultaneously rotating said spiral conveyor and the core breaking means in opposite directions, and means for effecting the transfer of the cuttings from said core breaking means onto said spiral conveyor.

11. Rotary drilling apparatus comprising an annular cutter adapted to cut a core, a spiral conveyor on which said cutter is mounted, means within said annular cutter and projecting beyond said conveyor adapted to break up the core and convey the cuttings rearwardly into the path of travel of said spiral conveyor, means for simultaneously rotating said spiral conveyor and said core breaking means in opposite directions, means for effecting a transfer of the cuttings from said core breaking means onto said spiral conveyor, and a protective sleeve surrounding said conveyor and forming the outer wall therefor.

12. Rotary drilling apparatus comprising a support, a rotatable shaft mounted in said support, an auger connected to the forward end of said shaft, a removable cutter bit carried by said auger, a rotatable tubular shaft surrounding said first mentioned shaft, a spiral member connected to the outer surface of said tubular shaft, a twin spiral connected to the forward end of said tubular shaft and surrounding a portion of said auger, and an annular cutter surrounding said auger and carried by said twin spiral.

13. A cutter head for a rotary drill comprising a cylindrical body, cutter teeth projecting from the edge of said cylindrical body, each having a slot formed on the leading edge thereof, a cutter bit positioned in the slot on each tooth and secured thereto, and means on the outer periphery of said cylindrical body for feeding said head into a bore and moving cuttings forward toward the cutter teeth.

14. A cutter head for a rotary drill comprising a cylindrical body, cutter teeth projecting from one edge of said body, and a spiral thread on the outer periphery of said body for feeding said head into bore and moving cuttings forward toward the cutter teeth.

15. A rotary drilling apparatus comprising an annular core cutter, a spiral conveyor carrying said core cutter, means for breaking up and conveying rearwardly the core cut by said cutter, means for moving the cuttings on outside of said core cutter forward into position to be engaged by said core breaking and conveying means, and means for transferring the cuttings from said core breaking and conveying means onto said conveyor.

16. Rotary drilling apparatus of the character set forth in claim 3, in which the rear end of the spiral conveyor is slidably mounted in a guide carried by said tubular shaft whereby the conveyor is capable of movement longitudinally of said shaft.

17. Rotary drilling apparatus of the character set forth in claim 3, in which the spiral conveyor is attached to the tubular shaft at its forward end, and is slidably mounted in a guide at the rear end of said tubular shaft whereby the conveyor is capable of moving longitudinally of said shaft.

18. In a rotary drilling apparatus the combination comprising a support, a tubular shaft having one end journaled in said support, a spiral conveyor surrounding said shaft and having its forward end attached thereto and its rear end slidable in a guide carried by said shaft to permit movement thereof longitudinally of said shaft, an annular core cutter secured to the forward end of said spiral conveyor, and means operating within annular cutter for breaking up the core and conveying the same rearwardly into position to be engaged by said spiral conveyor.

19. In a rotary drilling apparatus of the combination comprising a support, a rotatable tubular shaft having one end journaled in said support, a spiral conveyor surrounding said shaft and having its forward end attached thereto, and its rear end slidable in a guide mounted on said shaft, an annular core cutter secured to the forward end of said spiral member, a protective sleeve attached to said support and surrounding said spiral conveyor and abutting against said annular core cutter, and means operating within said annular cutter for breaking up the core and conveying the same rearwardly into position to be engaged by said spiral conveyor.

JOSEPH F. JOY.